(12) United States Patent
Lee et al.

(10) Patent No.: US 11,187,287 B2
(45) Date of Patent: Nov. 30, 2021

(54) METHOD FOR CONTROLLING ENGAGEMENT OF ENGINE CLUTCH OF HYBRID ELECTRIC VEHICLE

(71) Applicants: Hyundai Motor Company, Seoul (KR); KIA Motors Corporation, Seoul (KR)

(72) Inventors: Chun Hyuk Lee, Hwaseong-si (KR); Kwon Chae Chung, Seoul (KR); Seong Ik Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/011,035

(22) Filed: Sep. 3, 2020

(65) Prior Publication Data

US 2021/0164528 A1    Jun. 3, 2021

(30) Foreign Application Priority Data

Dec. 2, 2019 (KR) .................. 10-2019-0158005

(51) Int. Cl.
*F16D 48/08* (2006.01)
*B60K 6/387* (2007.10)

(52) U.S. Cl.
CPC .............. *F16D 48/08* (2013.01); *B60K 6/387* (2013.01); *B60Y 2200/92* (2013.01); *B60Y 2300/18025* (2013.01); *F16D 2500/10412* (2013.01); *F16D 2500/3065* (2013.01); *F16D 2500/3067* (2013.01); *F16D 2500/30406* (2013.01); *F16D 2500/30806* (2013.01); *F16D 2500/3107* (2013.01); *F16D 2500/3108* (2013.01); *F16D 2500/3109* (2013.01); *F16D 2500/3121* (2013.01); *F16D 2500/3127* (2013.01)

(58) Field of Classification Search
CPC ........... F16D 48/08; F16D 2500/10412; F16D 2500/3121; F16D 2500/3067; F16D 2500/3109; F16D 2500/3107; F16D 2500/30806; F16D 2500/3127; F16D 2500/3108; F16D 2500/3065; B60K 6/387; B60Y 2200/92; B60Y 2300/18025
See application file for complete search history.

(56) References Cited

U.S. PATENT DOCUMENTS

| 2015/0151732 | A1* | 6/2015 | Kim | ............. | B60W 10/06 701/68 |
| 2019/0054921 | A1* | 2/2019 | Lee | ............. | B60W 30/1846 |

* cited by examiner

*Primary Examiner* — David J Hlavka
(74) *Attorney, Agent, or Firm* — McDonnell Boehnen Hulbert & Berghoff LLP

(57) ABSTRACT

Disclosed is a method for controlling engagement of an engine clutch in a hybrid electric vehicle in which an engagement control method of the engine clutch is accurately determined so as to minimize a determination error and a sense of discontinuity caused by conversion of the engagement control method resulting therefrom.

12 Claims, 10 Drawing Sheets

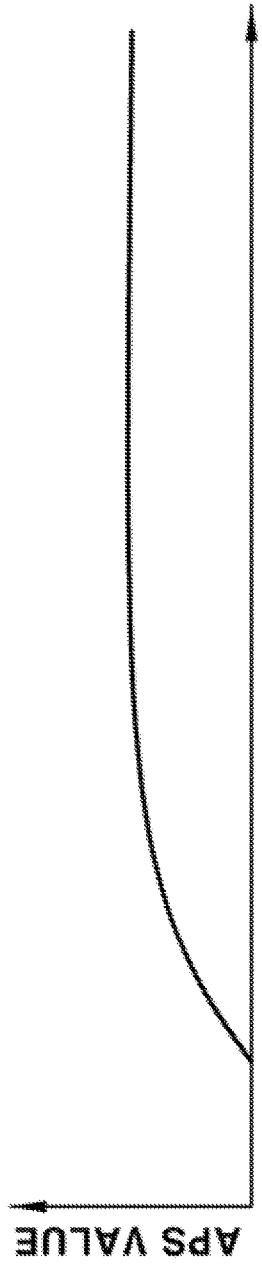
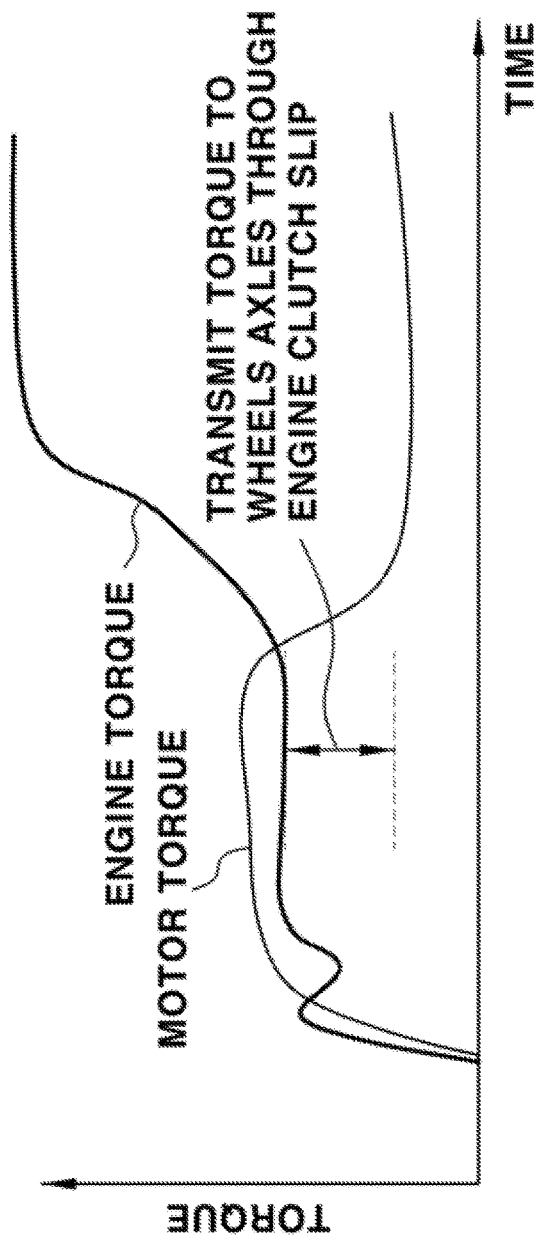
FIG. 2C
[ SYNCHRONIZATION ENGAGEMENT CONTROL ]
FIG. 2D
[ LAUNCH SLIP ENGAGEMENT CONTROL ]

METHOD FOR CONTROLLING ENGAGEMENT OF ENGINE CLUTCH OF HYBRID ELECTRIC VEHICLE

CROSS-REFERENCE TO RELATED APPLICATIONS

This application claims under 35 U.S.C. § 119(a) the benefit of priority to Korean Patent Application No. 10-2019-0158005 filed on Dec. 2, 2019, the entire contents of which are incorporated herein by reference.

FIELD

The present disclosure relates to a method for controlling engagement of an engine clutch in a hybrid electric vehicle. More particularly, it relates to a method for controlling engagement of an engine clutch in a hybrid electric vehicle in which an engagement control method of the engine clutch is accurately determined so as to minimize a determination error and a sense of discontinuity caused by conversion of the engagement control method resulting therefrom.

BACKGROUND

In general, a hybrid electric vehicle uses a combination of power of an engine and power of a motor during driving of the vehicle, and an engine clutch is installed between the engine and the motor. The engine clutch may transmit power between the engine and the motor.

The conventional hybrid vehicle drives using only power of the motor upon initial launching of the vehicle during parking, and then uses power of the engine according to a driver request or the state of charge (SOC) of a battery. The power of the engine may be transmitted to wheels through the engine clutch and a transmission, and excess power out of the power of the engine may charge the battery using the motor.

In order to transmit the power of the engine to the wheels or to use the power of the engine to charge the battery, the engine clutch should be engaged.

The maneuvers to control engagement of the engine clutch may be classified into two methods, i.e., synchronization engagement control and launch slip engagement control. In the synchronization engagement control, RPMs of the engine and the motor are synchronized and then the engine clutch is directly connected. In the launch slip engagement control, slip control of the engine clutch is performed before the RPMs of the engine and the motor are synchronized, and when the RPM of the motor is synchronized with the RPM of the engine, the engine clutch is directly connected.

Conventionally, when the engagement control method of the engine clutch at an initial stage of launching of a vehicle is initially determined, the synchronization engagement control is preferentially attempted. Thereafter, time-out conditions depending on a vehicle state and driving conditions are applied, and thus, when a designated time corresponding to the time-out conditions elapses during execution of the synchronization engagement control, the launch slip engagement control starts to be executed. The reason for this is that a control factor to determine the engine clutch engagement control method is not clear, and conversion of the engine clutch engagement control method to the launch slip engagement control during execution of the synchronization engagement control is possible but conversion of the engine clutch engagement control method to the synchronization engagement control during execution of the launch slip engagement control is not possible.

The reason why conversion of the engine clutch engagement control method to the launch slip engagement control during execution of the synchronization engagement control is allowable but conversion of the engine clutch engagement control method to the synchronization engagement control during execution of the launch slip engagement control is not possible is that, if an engine torque is used to control the speed of the engine while the engine torque is transmitted to wheels through slip control of the engine clutch, a drivability problem occurs.

SUMMARY OF THE DISCLOSURE

The present disclosure has been made in an effort to solve the above-described problems associated with the prior art, and it is an object of the present disclosure to provide a method for controlling engagement of an engine clutch in a hybrid electric vehicle in which an engagement control method of the engine clutch is accurately determined so as to minimize a determination error and a sense of discontinuity caused by conversion of the engagement control method resulting therefrom.

In one aspect, the present disclosure provides a method for controlling engagement of an engine clutch in a hybrid electric vehicle, the method including determining whether or not driving of the vehicle using power of a motor and power of an engine is required during driving using the power of the motor alone, determining whether or not at least one of two or more conditions for execution of synchronization engagement control of the engine clutch is satisfied, when driving of the vehicle using the power of the motor and the power of the engine is required, executing the synchronization engagement control, when the at least one of the two or more conditions for execution of the synchronization engagement control is satisfied, and executing launch slip engagement control of the engine clutch, when all of the two or more conditions for execution of the synchronization engagement control are not satisfied.

In a preferred embodiment, a first condition for execution of the synchronization engagement control may be that a real-time revolutions per minute (RPM) of the motor is a first RPM or more, and the first RPM may be set to a motor RPM value at which the motor may transmit power to wheels by tracking a torque of the engine when the engine clutch is directly connected. In another preferred embodiment, a second condition for execution of the synchronization engagement control may be that a maximum RPM of the motor which may maintain a maximum torque of the motor based on a real-time available power of the motor is an engine clutch direct connection RPM or more, and the engine clutch direct connection RPM may be an RPM at a point in time when the power of the engine starts to be transmitted to a drive shaft of the vehicle by direct connection of the engine clutch. In still another preferred embodiment, a third condition for execution of the synchronization engagement control may be that a maximum RPM of the motor which may satisfy a driver request torque based on a real-time available power of the motor is an engine clutch direct connection RPM or more, and the engine clutch direct connection RPM may be an RPM at a point in time when the power of the engine starts to be transmitted to a drive shaft of the vehicle by direct connection of the engine clutch.

In yet another preferred embodiment, a fourth condition for execution of the synchronization engagement control may be that acceleration linearity of the vehicle is satisfied, and when an excess acceleration of the vehicle is a threshold acceleration or more, it may be determined that the acceleration linearity of the vehicle is satisfied. In still yet another preferred embodiment, the excess acceleration may be calculated as a value acquired by dividing an excess torque of the vehicle by a weight of the vehicle, the excess torque may be calculated as a value acquired by subtracting a driving load of the vehicle from an available torque of the vehicle, and the available torque of the vehicle may be calculated as a value acquired by dividing a motor torque by a gear ratio of a transmission and a dynamic radius of tires.

In a further preferred embodiment, the driving load of the vehicle may be calculated by an equation "Driving Load= $(\mu \times m \times g \times \sin \theta)+(\text{Drag Torque of Transmission} \times V)+(\frac{1}{2} \times \rho \times Cd \times A \times V^2)$", $\mu$ may be a rolling resistance of the tires, m may be the weight of the vehicle, g may be acceleration due to gravity, $\theta$ may be a slope of a driving road, V may be a vehicle speed, $\rho$ may be air density, Cd may be an air resistance coefficient of the vehicle, and A may be a cross-sectional area of the vehicle which encounters air resistance during driving. In another further preferred embodiment, the threshold acceleration may be an acceleration value set according to a gear ratio of a transmission configured to connect the motor and a drive shaft.

In still another further preferred embodiment, when a reference time elapses before direct connection of the engine clutch during the execution of the synchronization engagement control, the execution of the synchronization engagement control may be stopped and the launch slip engagement control may start to be executed. In yet another further preferred embodiment, the reference time may be determined depending on an SOC of a battery used as a power of the motor, a slope of a driving road, and a gear ratio of a transmission.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 2C is another graph comparatively illustrating changes in RPMs and torques in synchronization engagement control and launch slip engagement control of an engine clutch;

FIG. 2D is another graph comparatively illustrating changes in RPMs and torques in synchronization engagement control and launch slip engagement control of an engine clutch;

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 1:
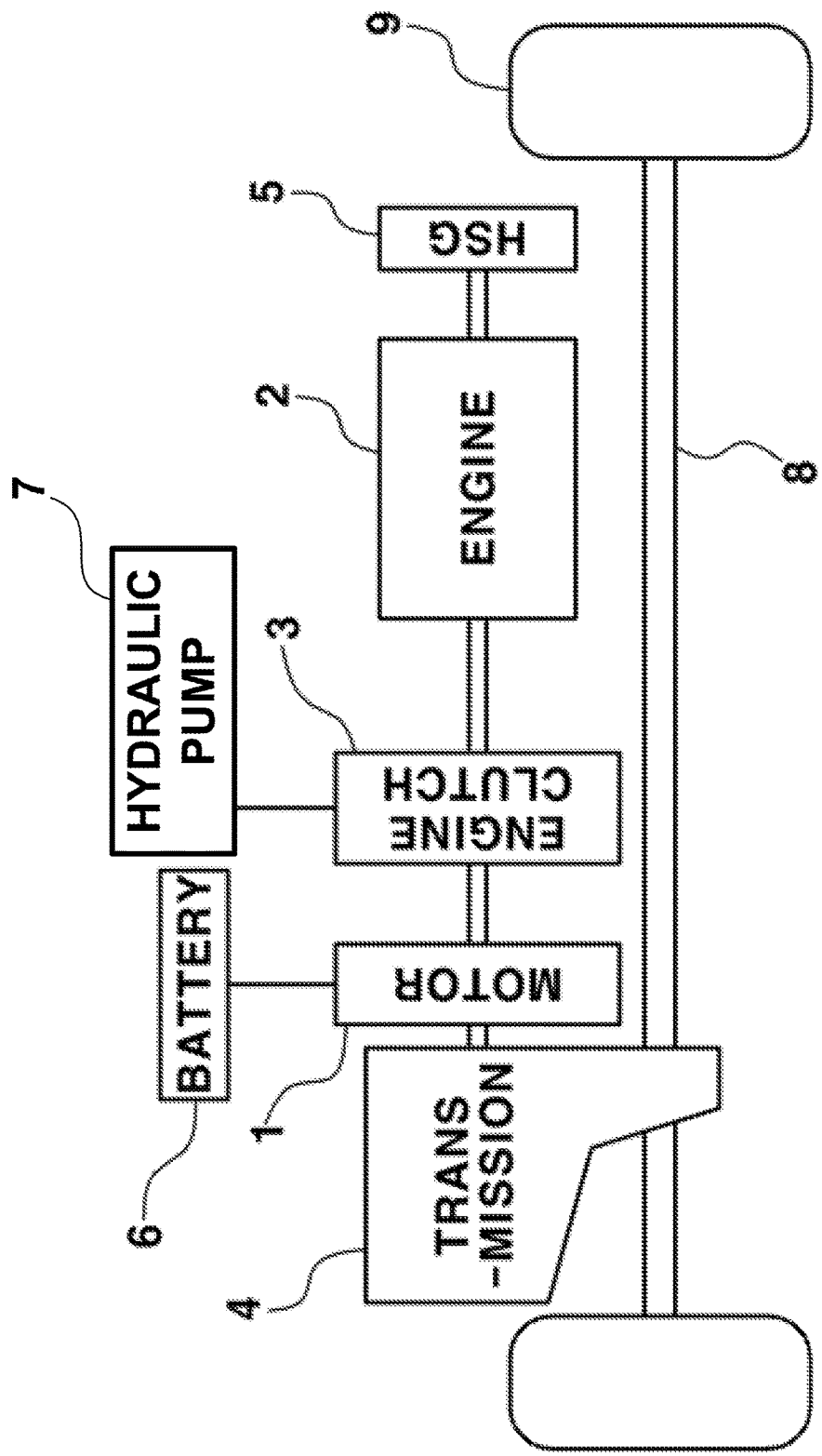
FIG. 1 is a view schematically illustrating a TMED system of a hybrid electric vehicle.
Figure 2A:
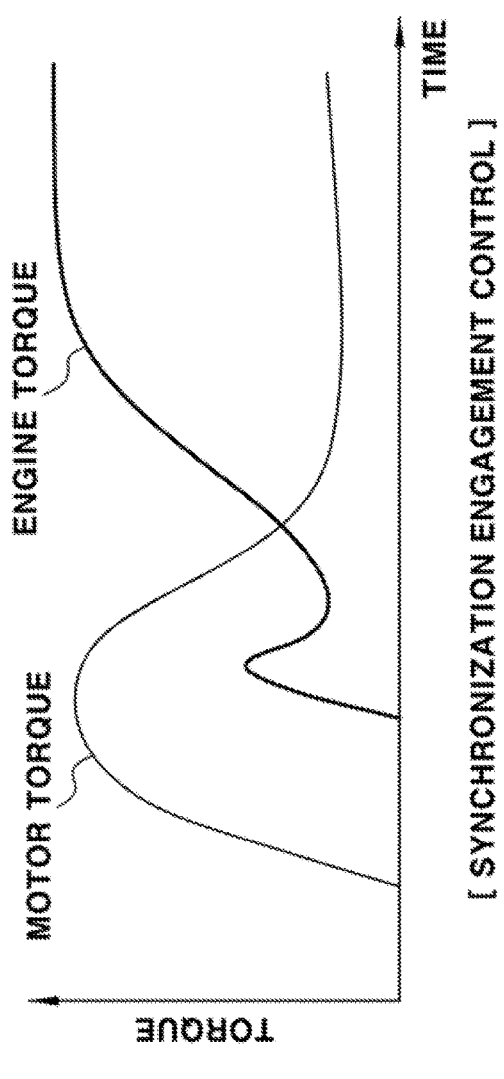
FIG. 2A is a graph comparatively illustrating changes in RPMs and torques in synchronization engagement control and launch slip engagement control of an engine clutch.
Figure 2B:
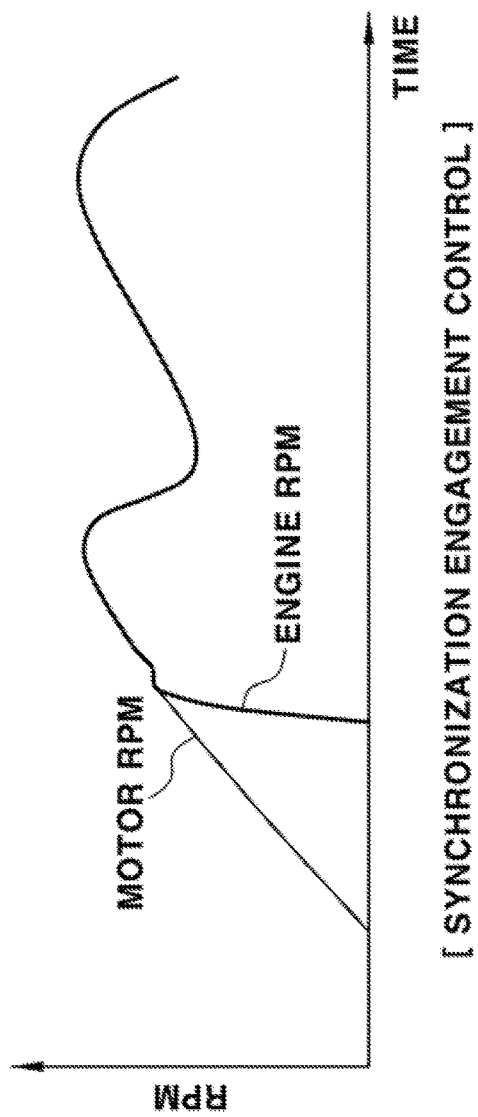
FIG. 2B is another graph comparatively illustrating changes in RPMs and torques in synchronization engagement control and launch slip engagement control of an engine clutch.
Figure 2E:
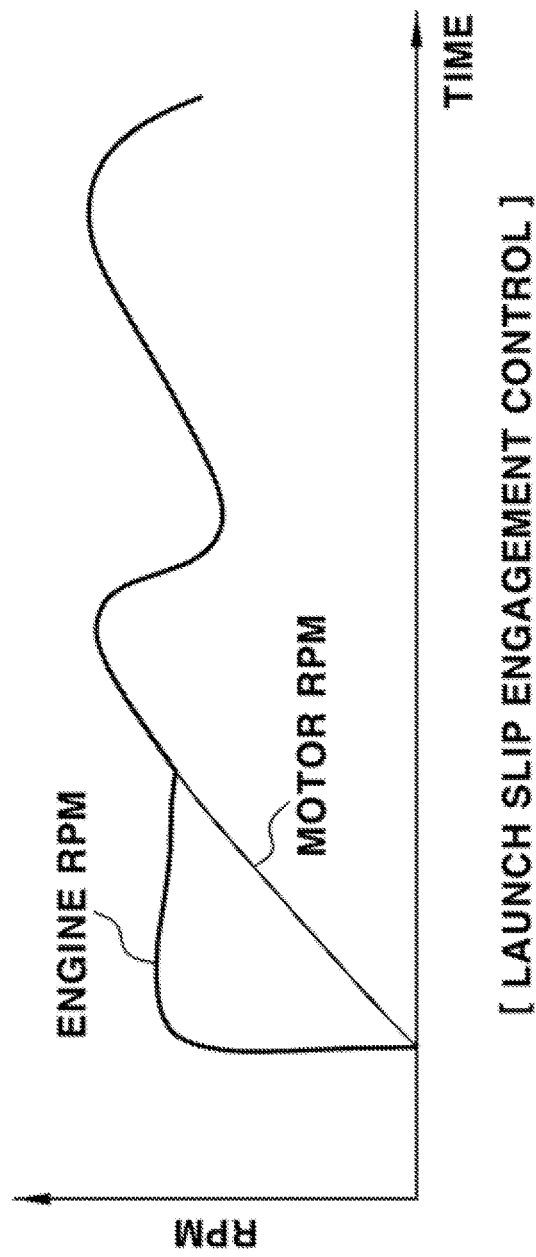
FIG. 2E is another graph comparatively illustrating changes in RPMs and torques in synchronization engagement control and launch slip engagement control of an engine clutch.
Figure 2F:
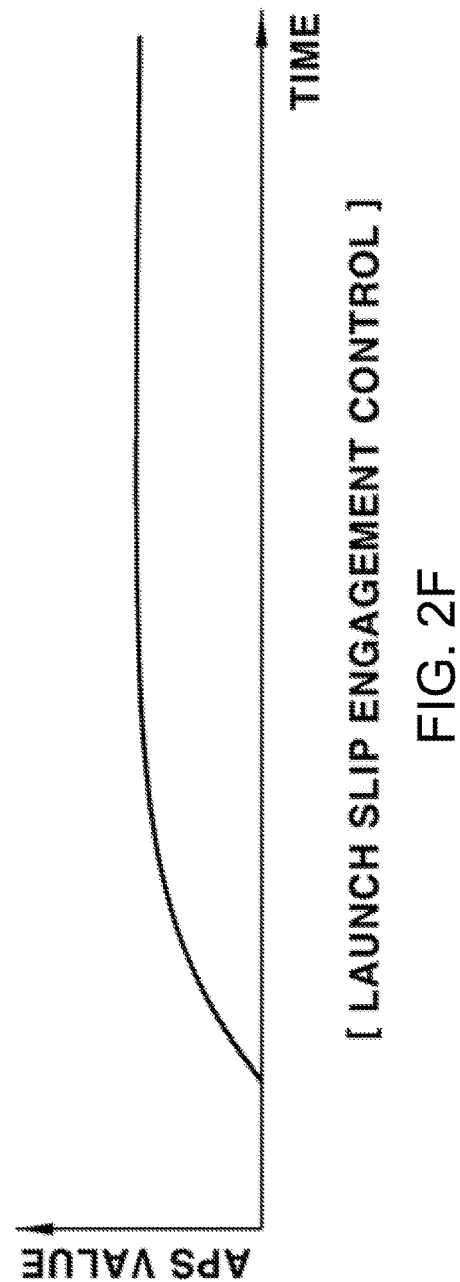
FIG. 2F is another graph comparatively illustrating changes in RPMs and torques in synchronization engagement control and launch slip engagement control of an engine clutch.

Referring to FIG. 1, in a hybrid electric vehicle to which a transmission mounted electric device (TMED) system is applied, an engine clutch 3 is installed between an engine 2 and a motor 1 for driving, and the engine clutch 3 is configured so as to transmit power between the engine 2 and the motor 1. According to the operation of the engine clutch 3, the engine 2 and the motor 1 are physically connected and thus the power of the engine 2 may be transmitted to driving wheels 9, or the engine 2 and the motor 1 are physically disconnected and thus the power of the engine 2 may not be transmitted to the driving wheels 9.

The above hybrid electric vehicle may use a combination of the power of the engine 2 and the power of the motor 1 while driving. The hybrid electric vehicle drives using only the power of the motor 1 in an electric vehicle (EV) mode, and drives using the power of the motor 1 and the power of the engine 2 in a hybrid electric vehicle (HEV) mode.

The conventional hybrid vehicle drives using only the power of the motor 1 in an initial stage of launching of the vehicle during parking, and then uses the power of the engine 2 according to a driver request or the state of charge (SOC) of a battery 6. The battery 6 is used as the power of the motor 1. The power of the engine 2 may be transmitted to a drive shaft 8 and the driving wheels 9 through the engine clutch 3 and a transmission 4, and excess power out of the power of the engine may charge the battery 6 using the motor 1.

In order to transmit the power of an engine to wheels or to use the power of the engine to charge a battery, an engine clutch should be physically engaged. However, due to characteristics of the engine, engagement of the engine clutch and power transmission using the engine clutch are impossible at a low RPM (for example, 1000 RPM or lower). The reason for this is that, when the engine clutch is engaged at a low RPM of the engine, an unstable state of the engine, such as a stall, occurs.

The maneuvers to control engagement of the engine clutch are classified into two methods, i.e., synchronization engagement control and launch slip engagement control. In other words, the synchronization engagement control is referred to as synchronization connection control, and the launch slip engagement control is referred to as launch slip connection control.

In the synchronization engagement control, a real-time motor speed is set to a target speed of the engine, an engine speed is controlled by a hybrid starter generator (HSG) 5 (in FIG. 1) so as to be synchronized with the motor speed, and then the engine clutch is directly connected using hydraulic pressure. This synchronization engagement control is used in conditions in which a vehicle speed may be controlled using only the power of the motor. Referring to FIGS. 2A to 2F, after a motor RPM and an engine RPM are synchronized, an engine torque is gradually increased and a motor torque is gradually decreased.

The launch engagement control is an engagement control method in which an engine torque is transmitted to the wheels through slip control of the engine clutch so as to raise a vehicle speed and a motor RPM, and thereby, when the motor speed is synchronized with the engine speed to a designated speed or less, the engine clutch is directly connected. That is, the launch engagement control is configured that the engine clutch is directly connected when the motor speed is synchronized with the engine speed to the designated speed or less during slip control of the engine clutch. Referring to FIGS. 2A to 2F, before the motor RPM and the engine RPM are synchronized, the engine torque is transmitted to the wheels through slip control of the engine clutch and thus the motor RPM is raised.

This launch slip engagement control is used if it is impossible to raise the motor RPM to a designated RPM or more using only the power of the motor. If it is impossible to raise the motor RPM to the designated RPM or more using only the power of the motor, the engine clutch may not be engaged and thus the power of the engine may not be transmitted to the wheels. For example, if the SOC of the battery is low, if the vehicle is in an extremely low temperature environmental condition, or if the vehicle drives on a steep slope, it is impossible to raise the motor RPM to the designated RPM or more using only the power of the motor.

The engagement control method of the engine clutch may be determined at the initial stage of launching of the vehicle based on the state of vehicle, driving conditions, etc.

However, conventionally, when the engagement control method of the engine clutch can be determined at the initial stage of launching of the vehicle, and the synchronization engagement control is preferentially attempted without considering the state of the vehicle and driving conditions. Thereafter, time-out conditions depending on the vehicle state and the driving conditions are applied, and thus, when a designated time corresponding to the time-out conditions elapses during execution of the synchronization engagement control, the launch slip engagement control starts to be executed. The reason for this is that a control factor to determine the engine clutch engagement control method is not clear, and conversion of the engine clutch engagement control method to the launch slip engagement control during execution of the synchronization engagement control is possible but conversion of the engine clutch engagement control method to the synchronization engagement control during execution of the launch slip engagement control is not possible.

In the present disclosure, an engagement control method of an engine clutch is determined based on specifications and state information of a vehicle and driving and environment information, and thus, accuracy to determine the engagement control method of the engine clutch may be increased and a determination error of the engagement control method and transition of the engagement control method thereby may be minimized.

Engagement control of the engine clutch refers to a series of controls which is performed to directly connect the engine clutch, and direct engagement of the engine clutch means a state in which the engine clutch is physically engaged and connected so that power of an engine is transmittable to wheels. That is, direct connection of the engine clutch may be attempted by executing the engagement control of the engine clutch, and the engine clutch may be actually directly connected when the engagement control of the engine clutch is completed.

A method for controlling engagement of an engine clutch in accordance with the present disclosure may be implemented by controllers which are installed in advance in a vehicle. More particularly, the method may be executed by an engine controller, a motor controller, a transmission controller, a hybrid controller, etc. The hybrid controller may be a higher-level controller of the engine controller, the motor controller and the transmission controller. The engine controller may control the overall operation of an engine system in the vehicle including an engine, and the motor controller may control the overall operation of a motor system in the vehicle including a motor. The transmission controller may control the overall operation of a transmission.

In the method in accordance with the present disclosure, if engagement control of the engine clutch 3 is required, more particularly, if conversion of a driving mode of the vehicle to the HEV mode during driving in the EV mode, like at the initial stage of launching of the vehicle, is required by a driver, the synchronization engagement control may be executed or the launch slip engagement control may be executed according to a result of determination as to whether or not a condition for execution of the synchronization engagement control is satisfied.

Figure 3:
FIG. 3 is a flowchart representing a method for controlling engagement of an engine clutch in accordance with the present disclosure.

Referring to FIG. 3, the method in accordance with the present disclosure includes determining whether or not driving of the vehicle in the HEV mode is required during driving in the EV mode, determining whether or not at least one of two or more conditions for execution of synchronization engagement control of the engine clutch 3 is satisfied when driving of the vehicle in the HEV mode is required, executing the synchronization engagement control when the at least one of the two or more conditions for execution of the synchronization engagement control is satisfied, and executing launch slip engagement control of the engine clutch 3 when all of the two or more conditions for execution of the synchronization engagement control are not satisfied.

In the determination as to whether or not driving of the vehicle in the HEV mode is required during driving in the EV mode, whether or not conversion of the driving mode of the vehicle to the HEV mode is required may be determined based on a driver request torque. When the driver request torque exceeds a maximum torque which the motor 1 may output in real time during driving in the EV mode, it may be determined that conversion of the driving mode of the vehicle from the EV mode to the HEV mode is required.

The driver request torque may be detected by an accelerator position sensor (APS) which detects the position of an accelerator pedal (i.e., a movement amount of the accelerator pedal). The driver request torque may be calculated using a torque map which is constructed to determine the driver request torque according to the position value of the accelerator pedal.

In the determination as to whether or not the at least one of the two or more conditions for execution of the synchronization engagement control is satisfied, whether or not the two or more conditions for execution of the synchronization engagement control of the engine clutch 3 are satisfied is determined based on a first condition, a second condition, a third condition and a fourth condition. When at least one of the first to fourth conditions is satisfied, it may be determined that the vehicle is in a situation in which the synchronization engagement control is executable. That is, when the at least one of the first to fourth conditions is satisfied, it may be determined that the condition for execution of the synchronization engagement control of the engine clutch 3 is satisfied.

Figure 4A:
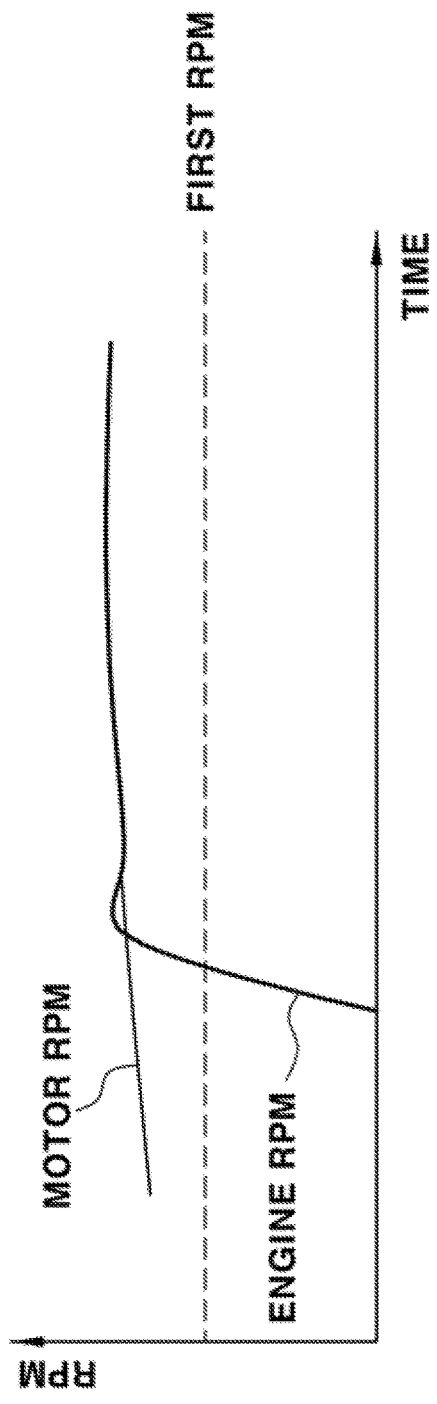
FIG. 4A is a graph for explaining a first condition in accordance with the present disclosure.
Figure 4B:
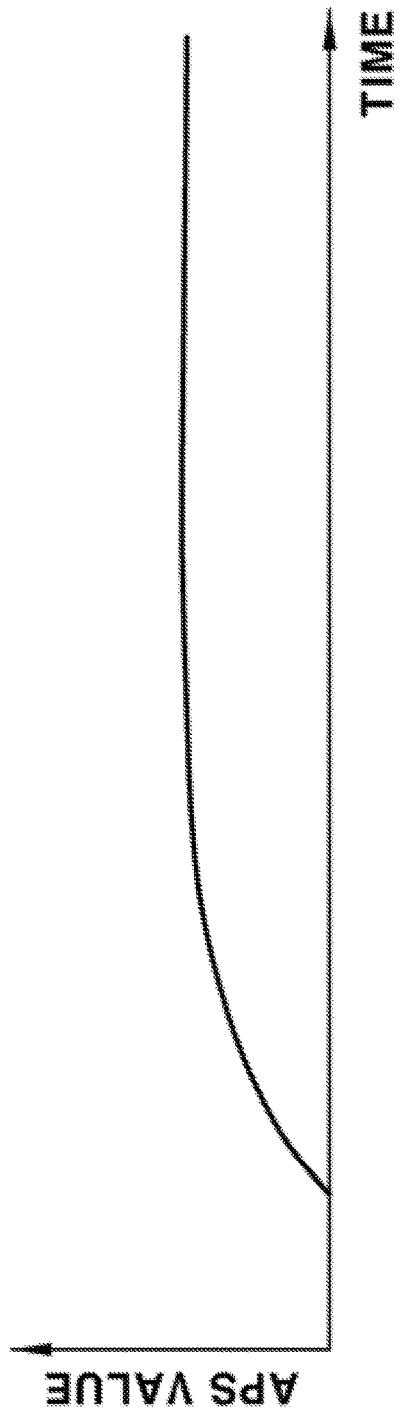
FIG. 4B is another graph for explaining a first condition in accordance with the present disclosure.

The first condition is that a real-time revolutions per minute (RPM) of the motor 1 is a first RPM or more. That is, when the real-time RPM of the motor 1 is the first RPM or more, it may be determined that the first condition is satisfied. The first RPM may be set to a motor RPM value which ensures operation stability of the engine 2 when the engine clutch 3 is engaged, in consideration of characteristics of the engine 2. Specifically, the first RPM may be set to a motor RPM value at which the motor 1 may transmit power to the driving wheels 9 by tracking the torque of the engine 2 when the engine clutch 3 is directly connected. Due to characteristics of the engine 2, if the engine clutch 3 is directly connected at a low RPM of the engine 2, the engine 2 becomes unstable and thus accuracy in the torque of the engine 2 may be lowered. For example, the RPM of the engine 2 which is less than 1000 RPM may be determined as a state in which the RPM of the engine 2 is low. The first RPM may be 1000 RPM or more. Referring to FIGS. 4A and 4B, a motor RPM at a point in time when the driving mode of the vehicle is converted to the HEV mode according to a driver request is the first RPM or more, the synchronization engagement control may be executed.

Figure 5:
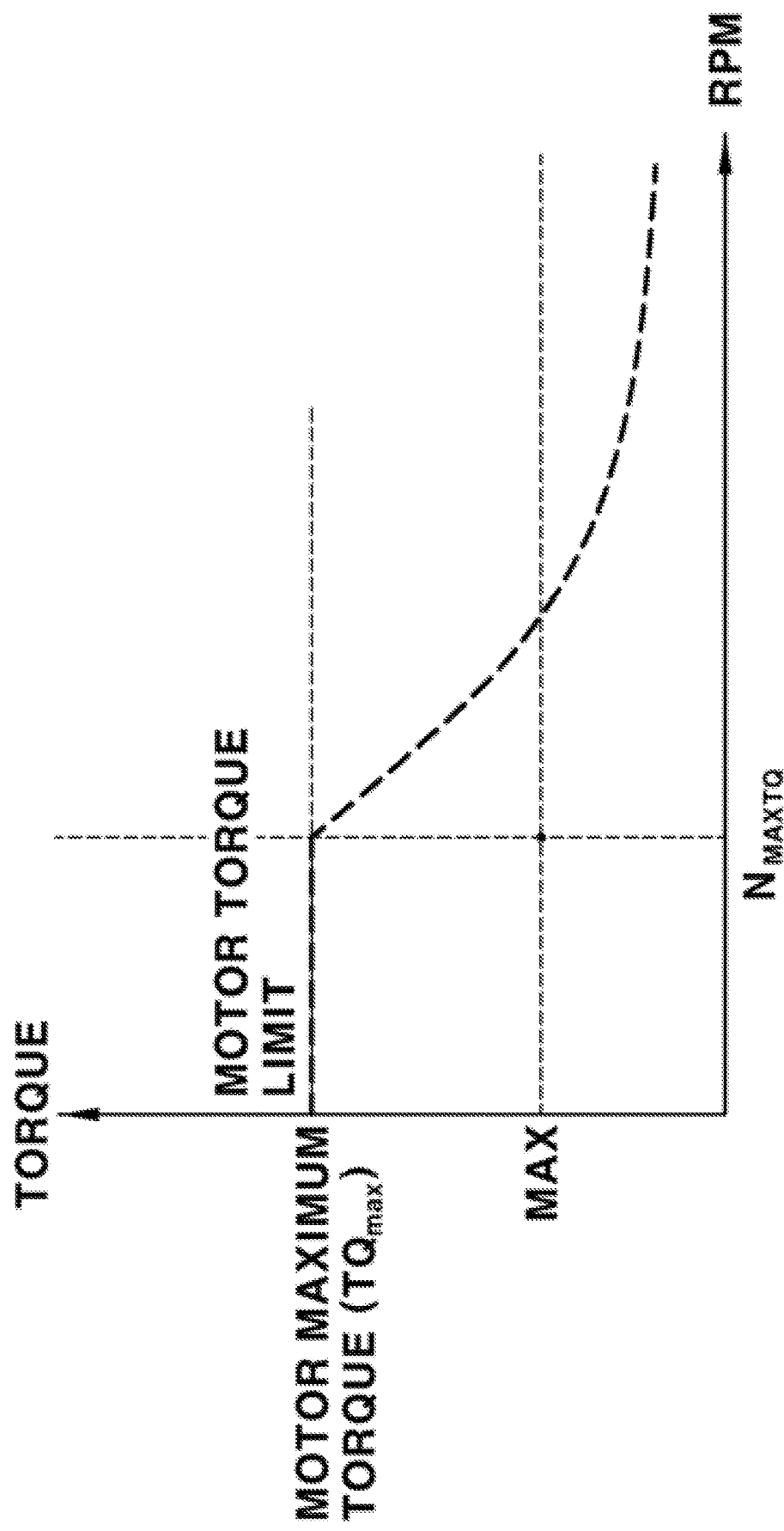
FIG. 5 is a graph for explaining a second condition in accordance with the present disclosure.

The second condition is that a maximum RPM $N_{MAXTQ}$ of the motor 1 which may maintain the maximum torque of the motor 1 based on the real-time available power of the motor 1 is a second RPM (i.e., an engine clutch direct connection RPM) or more. That is, when the maximum RPM $N_{MAXTQ}$ of the motor 1 is the engine clutch direct connection RPM or more, it may be determined that the second condition is satisfied. The maximum torque of the motor 1 is a motor torque which may be generated based on the real-time available power of the motor 1. The real-time available power of the motor 1 may be the real-time available power of the battery 6 which is used as the power of the motor 1. Since the motor 1 generates a torque using the power of the battery 6, the motor torque is changed according to the power of the battery 6 which is determined based on the SOC of the battery 6 and temperature, and thus, the RPM which may ensure the maximum torque of the motor 1 is also changed according to the power of the battery 6. Referring to FIG. 5, the maximum torque $TQ_{MAX}$ of the motor 1 based on the available power of the motor 1 is maintained to a designated RPM, i.e., the maximum RPM $N_{MAXTQ}$.

Further, the engine clutch direct connection RPM is an RPM at a point in time when the power of the engine 2 starts to be transmitted to the drive shaft 8 of the vehicle by direct connection of the engine clutch 3 due to hydraulic pressure supplied from a hydraulic pump 7 (in FIG. 1) after synchronization between the RPM of the engine 2 and the RPM of the motor 1. That is, the engine clutch direct connection RPM is the RPM of the engine 2 and the motor 1 when the engine clutch 3 is directly connected. For example, the engine clutch direct connection RPM may be 1300 RPM or more.

In addition, a torque value of the motor 1 may be calculated using Equation 1 below.

$$TQ = P_{ELEC}/(N_{motor} \times 2\pi/60) \qquad [\text{Equation 1}]$$

Here, TQ is motor torque, $P_{ELEC}$ is power of the battery 6, and $N_{motor}$ is motor RPM.

Figure 6:
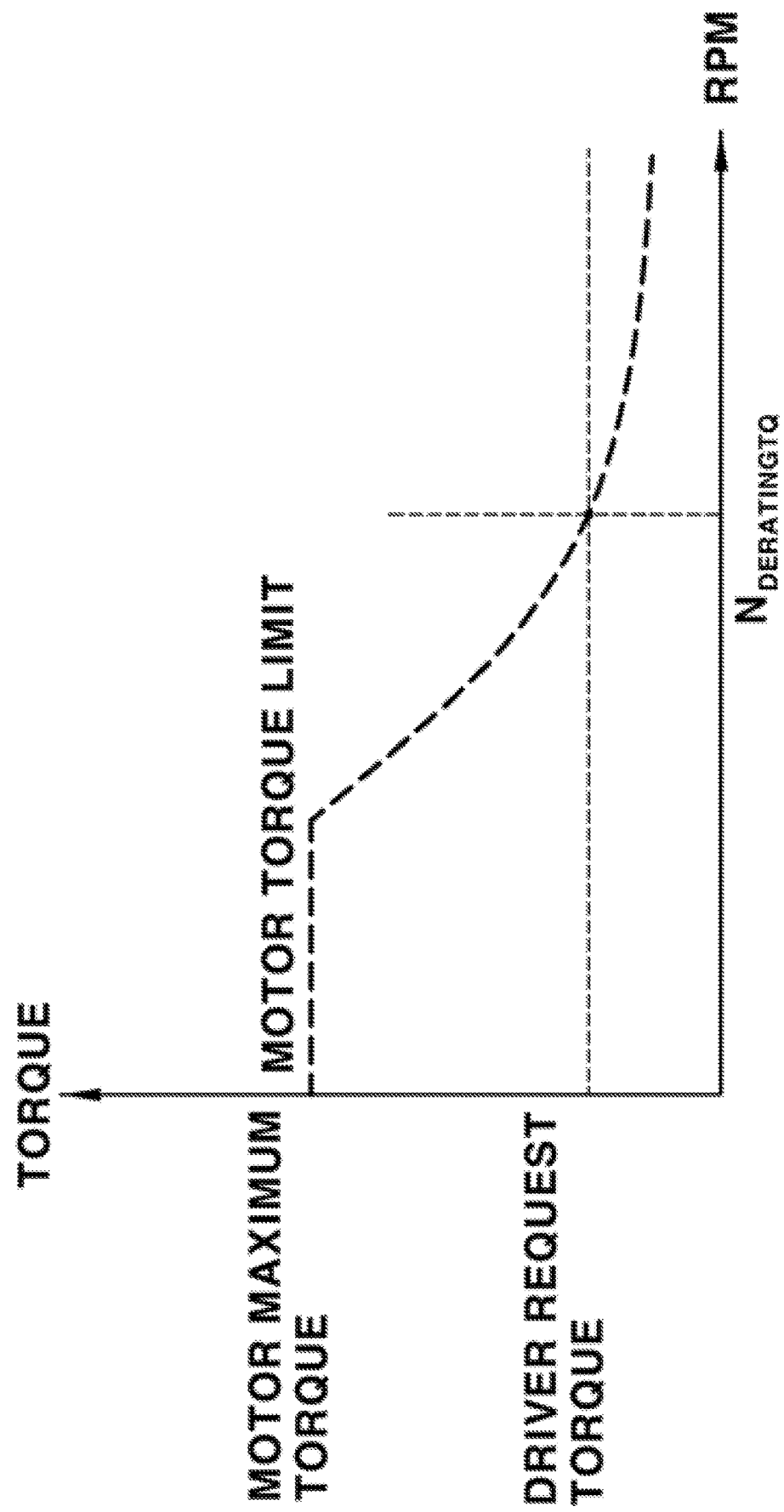
FIG. 6 is a graph for explaining a third condition in accordance with the present disclosure.

The third condition is that a maximum RPM of the motor 1 which may satisfy the driver request torque based on the real-time available power of the motor 1 is the engine clutch direct connection RPM or more. That is, when the maximum RPM of the motor 1 is the engine clutch direct connection RPM or more, it may be determined that the third condition is satisfied. The maximum RPM of the motor 1 which may satisfy the driver request torque and the maximum RPM of the motor 1 which may maintain the maximum torque of the motor 1 may have different values (referring to FIGS. 5 and 6). Referring to FIG. 6, the motor torque which may correspond to the driver request torque is maintained only up to a designated RPM $N_{DERATINGTQ}$. Therefore, a maximum RPM of the motor 1 which may maintain a motor torque, which is the driver request torque or more, is the RPM $N_{DERATINGTQ}$.

The fourth condition is that acceleration linearity of the vehicle is satisfied. Whether or not acceleration linearity of the vehicle is satisfied may be determined based on a result of comparison between an excess acceleration and a threshold acceleration. Specifically, when the excess acceleration is the threshold acceleration or more, it may be determined that acceleration linearity of the vehicle is satisfied. The excess acceleration may be an acceleration which is actually generated during driving of the vehicle, and the excess acceleration may be determined based on the excess torque and weight of the vehicle. Furthermore, the excess acceleration may be calculated as a value acquired by dividing the excess torque of the vehicle by the weight of the vehicle.

Figure 7:
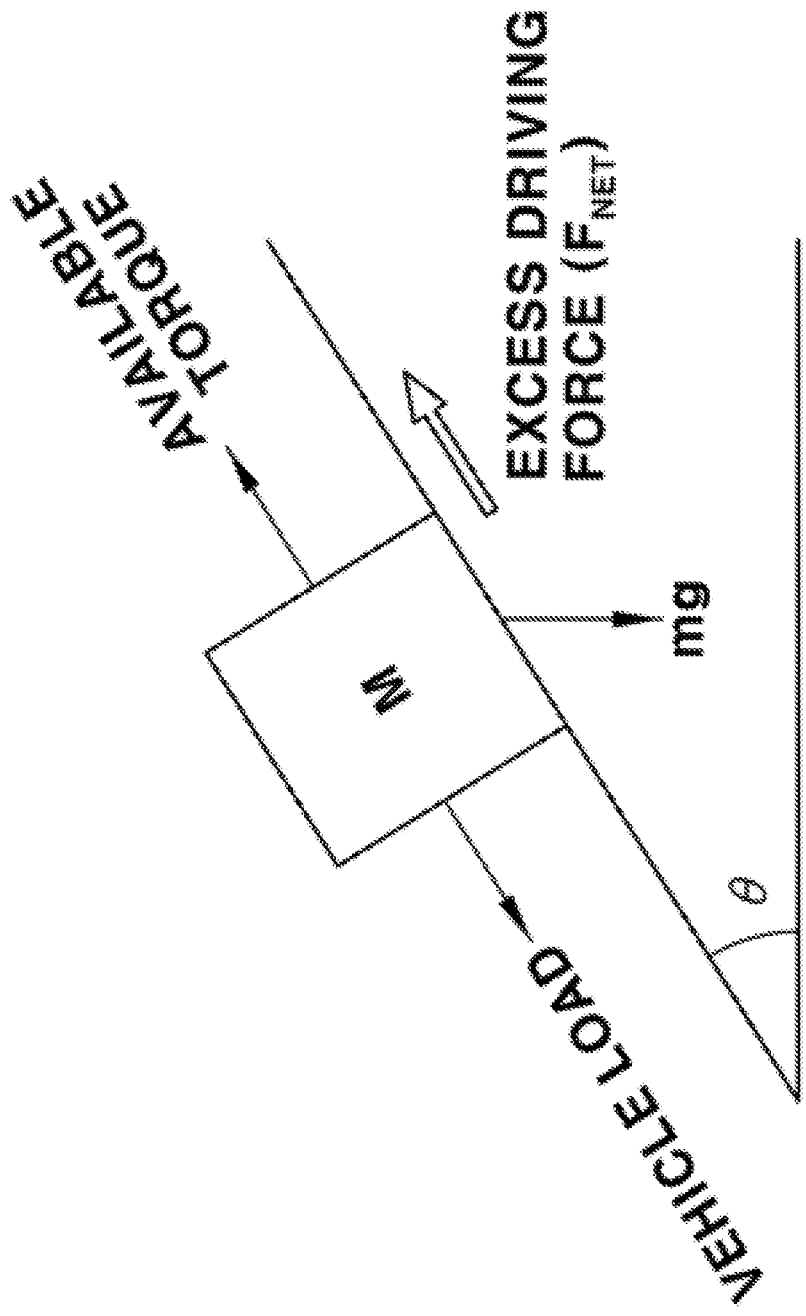
FIG. 7 is a graph for explaining a fourth condition in accordance with the present disclosure.

The excess torque is an excess driving force $F_{NET}$ of the vehicle for actual driving. That is, the vehicle may drive using the excess torque. Referring to FIG. 7, the excess torque $F_{NET}$ may be determined as a value acquired by subtracting a driving load of the vehicle from an available torque of the vehicle. The available torque of the vehicle is an available torque of the wheels (i.e., the drive wheels) 9, and the available torque of the vehicle may be calculated as a value acquired by dividing a real-time torque of the motor 1 by a gear ratio of the transmission 4 (in FIG. 1) and a dynamic radius of tires. The driving load is a driving load applied to the driving wheels 9, and the driving load may be determined based on specifications information and a driving speed of the vehicle and a slope of a driving road. Specifically, the driving load may be calculated based on a rolling resistance μ of the tires, a weight m of the vehicle, driving system drag, an aerodynamic force, and a slope θ of a driving road. The driving system drag is drag generated by a driving system of the vehicle during driving, and the driving system drag may be a drag torque of the transmission 4. The drag torque may be a torque generated by a transmission oil drag phenomenon. The driving load may be calculated using Equation 2 below.

Driving Load=(μ×m×g×sin θ)+(Drag Torque of Transmission×V)+(½×ρ×Cd×A×V²)    [Equation 2]

Here, g is acceleration due to gravity, V is a vehicle speed, ρ is air density, Cd is an air resistance coefficient of the vehicle, and A is a cross-sectional area of the vehicle. The cross-sectional area of the vehicle is a cross-sectional area of the vehicle which encounters air resistance during driving.

The threshold acceleration may be an acceleration value which is set in advance through tests. The threshold acceleration may be changed according to the gear ratio of the transmission 4 connecting the motor 1 and the drive shaft 8. That is, the threshold acceleration may be an acceleration value which is set according to the gear ratio of the transmission 4. Specifically, the threshold acceleration may be set to different values if the gear position of the transmission 4 is the position D and if the gear position of the transmission 4 is the position R.

On the other hand, when all of the first to fourth conditions are not satisfied, the launch slip engagement control of the engine clutch 3 is executed. Further, although at least one of the first to fourth conditions is satisfied and thus the synchronization engagement control is executed, when a reference time elapses before direct connection of the engine clutch 3, the execution of the synchronization engagement control is stopped and the launch slip engagement control starts to be executed. That is, when the reference times elapses while attempting direct connection of the engine clutch 3 by the synchronization engagement control, the launch slip engagement control is executed. In other words, when physical engagement of the engine clutch 3 is not carried out until the reference time elapses from start of the execution of the synchronization engagement control, the launch slip engagement control is executed. The reason for this is that, even if at least one of the conditions for execution of the synchronization engagement control is satisfied in terms of the driving force or acceleration linearity of the vehicle, when the vehicle drives using only the motor 1 for a designated time before direct connection of the engine clutch 3 for the reference time, the power of the battery 6 is consumed. In other words, the vehicle drives using only the driving force of the motor 1 while direct connection of the engine clutch 3 is attempted through the synchronization engagement control, and, as a time taken to drive the vehicle using only the driving force of the motor increases, the SOC of the battery is reduced and thus SOC balancing of the battery 6 is lowered. Such a phenomenon mainly occurs, for example, if the vehicle drives on an uphill road or if the driving system drag is high in winter. Therefore, when the reference time elapses, the engagement control method of the engine clutch 3 is converted to the launch slip engagement control, thus being capable of preventing exhaustion of the SOC of the battery 6. When the engagement control method of the engine clutch 3 is converted to the launch slip engagement control, slip control of the engine clutch 3 is performed, a portion of power of the engine 2 is transmitted to the drive wheels 9, and thereby, the amount of power of the motor 1 used may be reduced and SOC balancing of the battery 6 may be ensured. Here, the reference time may be determined depending on the SOC of the battery 6, a slope of a driving road and a gear position (gear ratio) of the transmission 4. Specifically, as the SOC of the battery 6 increases, the reference time may be lengthened, and as the SOC of the battery 6 decreases, the reference time may be shortened. Further, as the slope of the driving road increases, the reference time may be shortened, and as the slope of the driving road decreases, the reference time may be lengthened.

Figure 8A:
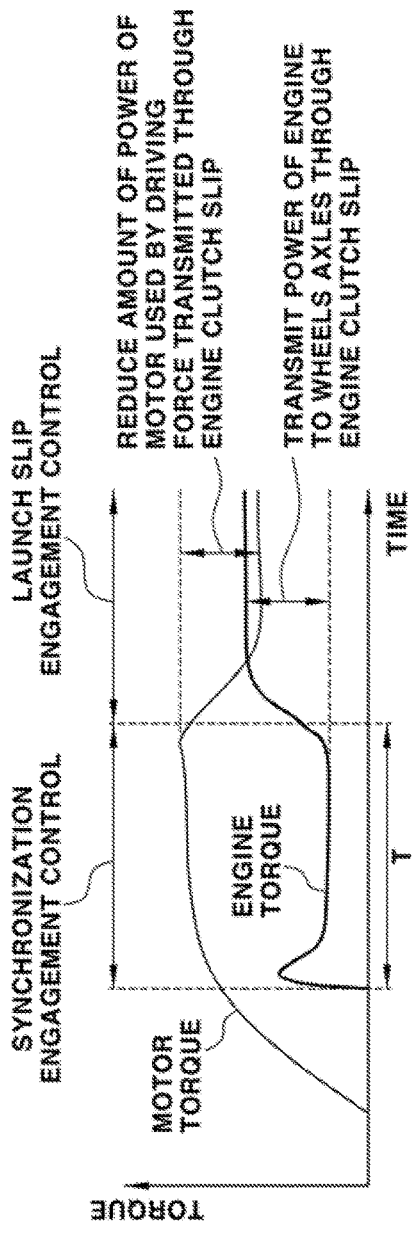
FIG. 8A is a graph representing conversion of an engagement control method to launch slip engagement control during execution of synchronization engagement control.
Figure 8B:
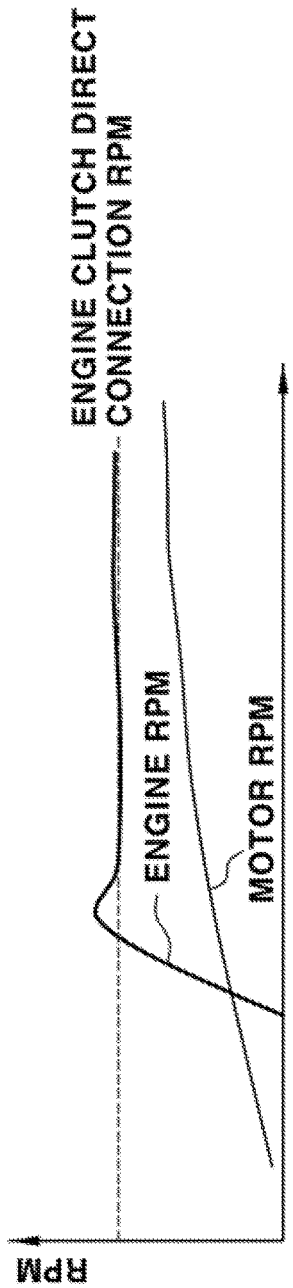
FIG. 8B is another graph representing conversion of an engagement control method to launch slip engagement control during execution of synchronization engagement control.
Figure 8C:
FIG. 8C is another graph representing conversion of an engagement control method to launch slip engagement control during execution of synchronization engagement control.

Referring to FIGS. 8A to 8C, if the launch engagement control is executed, slip control of the engine clutch 3 is performed by applying hydraulic pressure to the engine clutch 3 before synchronization between the engine RPM and the motor RPM, and thereby, a portion of power of the engine 2 is transmitted to the drive wheels 9. The amount of power of the motor 1 used may be reduced by the engine torque (i.e., driving force) transmitted to the driving wheels 9 through the slip control of the engine clutch 3, and thereby, consumption of the SOC of the battery 6 may be reduced.

Referring to FIG. 3, if the engagement control method of the engine clutch 3 is converted to the launch slip engagement control according to a driver request during driving in the EV mode, the engagement control method of the engine clutch 3 may be determined as follows.

First, whether or not conversion of the driving mode of the vehicle from the EV mode to the HEV mode is required based on a driver request torque is determined (S10). If conversion of the driving mode of the vehicle from the EV mode to the HEV mode is required, whether or not the real-time RPM of the motor is the first RPM or more is determined (S12). When the motor RPM at a point in time when the driving mode of the vehicle is converted from the EV mode to the HEV mode is the first RPM or more, the synchronization engagement control is executed (S14).

When the motor RPM at the point in time when the driving mode of the vehicle is converted from the EV mode to the HEV is less than the first RPM, whether or not a maximum RPM $N_{MAXTQ}$ of the motor 1 which may maintain the maximum torque of the motor 1 based on the real-time available power of the motor 1 is the engine clutch direct connection RPM or more is determined (S16). When the maximum RPM $N_{MAXTQ}$ of the motor 1 is the engine clutch direct connection RPM or more, the synchronization engagement control is executed (S18).

When the maximum RPM $N_{MAXTQ}$ of the motor 1 is less than the engine clutch direct connection RPM, whether or not a maximum RPM of the motor 1 which may satisfy the driver request torque based on the real-time available power of the motor 1 is the engine clutch direct connection RPM or more is determined (S20). When the maximum RPM of the motor 1 is the engine clutch direct connection RPM or more, the synchronization engagement control is executed (S22).

When the maximum RPM of the motor 1 is less than the engine clutch direct connection RPM, whether or not acceleration linearity of the vehicle is satisfied is determined (S24). When acceleration linearity of the vehicle is satisfied, the synchronization engagement control is executed (S26). When an excess acceleration of the vehicle is a threshold acceleration or more, it may be determined that acceleration linearity of the vehicle is satisfied. When acceleration linearity of the vehicle is not satisfied, the launch slip engagement control is executed (S28).

In operations S14, S18, S22 and S26, whether or not a reference time T elapses after start of the execution of the synchronization engagement control is determined (S30). When the reference time T elapses after start of the execution of the synchronization engagement control, the launch slip engagement control is executed (S32). That is, when direct connection of the engine clutch 3 due to the synchronization engagement control is not carried out within the reference time T, the execution of the synchronization engagement control is stopped and the launch slip engagement control starts to be executed.

As is apparent from the above description, in a method for controlling engagement of an engine clutch in a hybrid electric vehicle in accordance with the present disclosure, a control factor to determine an engagement control method of the engine clutch is clearly constructed, and thus, the engagement control method of the engine clutch at a point in time when engagement control of the engine clutch is necessary may be accurately determined so as to minimize a determination error of the engagement control method and conversion of the engagement control method thereby.

That is, in the method in accordance with the present disclosure, unnecessary conversion of the engagement control method due to a determination error of the engagement control method may be minimized, and a sense of discontinuity caused by conversion of the engagement control method may be minimized.

The present disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling engagement of an engine clutch in a hybrid electric vehicle, the method comprising:
   determining whether or not driving of the hybrid electric vehicle using power of a motor and power of an engine is required during driving using the power of the motor alone;
   determining whether or not at least one of two or more conditions for execution of a synchronization engagement control of the engine clutch is satisfied, when driving of the hybrid electric vehicle using the power of the motor and the power of the engine is required;
   executing the synchronization engagement control, when the at least one of the two or more conditions for execution of the synchronization engagement control is satisfied; and
   executing a launch slip engagement control of the engine clutch, when all of the two or more conditions for execution of the synchronization engagement control are not satisfied.

2. The method of claim 1, wherein a first condition for execution of the synchronization engagement control is that a real-time revolutions per minute (RPM) of the motor is a first RPM or more, and the first RPM is set to a motor RPM value at which the motor may transmit power to wheels by tracking a torque of the engine when the engine clutch is directly connected.

3. The method of claim 1, wherein a second condition for execution of the synchronization engagement control is that a maximum RPM of the motor which may maintain a maximum torque of the motor based on a real-time available power of the motor is an engine clutch direct connection RPM or more, and the engine clutch direct connection RPM is an RPM at a point in time when the power of the engine starts to be transmitted to a drive shaft of the hybrid electric vehicle by direct connection of the engine clutch.

4. The method of claim 1, wherein a third condition for execution of the synchronization engagement control is that a maximum RPM of the motor which may satisfy a driver request torque based on a real-time available power of the motor is an engine clutch direct connection RPM or more, and the engine clutch direct connection RPM is an RPM at a point in time when the power of the engine starts to be transmitted to a drive shaft of the hybrid electric vehicle by direct connection of the engine clutch.

5. The method of claim 1, wherein a fourth condition for execution of the synchronization engagement control is that acceleration linearity of the hybrid electric vehicle is satisfied, and when an excess acceleration of the hybrid electric vehicle is a threshold acceleration or more, it is determined that the acceleration linearity of the hybrid electric vehicle is satisfied.

6. The method of claim 5, wherein the excess acceleration is calculated as a value acquired by dividing an excess torque of the hybrid electric vehicle by a weight of the hybrid electric vehicle, the excess torque is calculated as a value acquired by subtracting a driving load of the hybrid electric vehicle from an available torque of the hybrid electric vehicle, and the available torque of the hybrid electric vehicle is calculated as a value acquired by dividing a motor torque by a gear ratio of a transmission and a dynamic radius of tires.

7. The method of claim 6, wherein the driving load of the hybrid electric vehicle is calculated by an equation "Driving Load=$(\mu \times m \times g \times \sin \theta)+$(Drag Torque of Transmission$\times$V)$+$($\frac{1}{2} \times \rho \times Cd \times A \times V^2$)",
   wherein $\mu$ is a rolling resistance of the tires, m is the weight of the hybrid electric vehicle, g is acceleration due to gravity, $\theta$ is a slope of a driving road, V is a vehicle speed, $\rho$ is air density, Cd is an air resistance coefficient of the hybrid electric vehicle, and A is a cross-sectional area of the hybrid electric vehicle which encounters air resistance during driving.

8. The method of claim 5, wherein the threshold acceleration is an acceleration value set according to a gear ratio of a transmission configured to connect the motor and a drive shaft.

9. The method of claim 1, wherein, when a reference time elapses before direct connection of the engine clutch during the execution of the synchronization engagement control, the execution of the synchronization engagement control is stopped and the launch slip engagement control starts to be executed.

10. The method of claim 9, wherein the reference time is determined depending on an SOC of a battery used as a power of the motor, a slope of a driving road, and a gear ratio of a transmission.

11. The method of claim 1, wherein the synchronization engagement control is an engagement control method in which the engine clutch is directly connected after RPMs of the engine and the motor are synchronized.

12. The method of claim 1, wherein the launch slip engagement control is an engagement control method in which slip control of the engine clutch is performed before RPMs of the engine and the motor are synchronized, and when the RPM of the motor is synchronized with the RPM of the engine, the engine clutch is directly connected.

* * * * *